(12) United States Patent
Nottingham

(10) Patent No.: US 6,575,634 B2
(45) Date of Patent: Jun. 10, 2003

(54) THERMAL COMPENSATION WITHOUT CREEP IN A HYDRODYNAMIC BEARING

(75) Inventor: Robert A. Nottingham, Santa Cruz, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/896,445

(22) Filed: Jun. 28, 2001

(65) Prior Publication Data

US 2002/0114547 A1 Aug. 22, 2002

Related U.S. Application Data

(60) Provisional application No. 60/270,223, filed on Feb. 20, 2001.

(51) Int. Cl.⁷ .......................... F16C 32/06; F16C 17/22
(52) U.S. Cl. ........................................ 384/110; 384/905
(58) Field of Search ............................. 384/110, 278, 384/905

(56) References Cited

U.S. PATENT DOCUMENTS

| | | | | |
|---|---|---|---|---|
| 5,664,889 A | * | 9/1997 | Gustafson | 384/100 |
| 5,873,657 A | * | 2/1999 | Lee | 384/110 |
| 6,065,877 A | * | 5/2000 | Leuthold et al. | 384/110 |
| 6,144,523 A | * | 11/2000 | Murthy et al. | 384/110 |
| 6,154,339 A | * | 11/2000 | Grantz et al. | 384/110 |

* cited by examiner

Primary Examiner—Thomas R. Hannon
(74) Attorney, Agent, or Firm—Moser, Patterson and Sheridan, LLP

(57) ABSTRACT

A hydrodynamic bearing is provided comprising a shaft having a pair of spaced apart conical bearings supporting a surrounding sleeve for rotations. The sleeve comprises a single piece rather than the two-piece design separated by a rubber expansion joint of the prior art. Instead upper and lower slots are cut into the sleeve, and the rings are pressed or otherwise tightly fitted into each slot. The single piece sleeve which also incorporates the bearing seats for the conical bearings on the shaft, is made of aluminum, while each ring is made of steel (as is the shaft and bearing cones). As the temperature rises at which the hydrodynamic bearing is operated, the sleeve expands axially putting the bearing seat closer to the cone, effectively compensating for the thinning of the fluid which supports the bearing seat and sleeve for rotation relative to the cone. Meanwhile, the steel ring, being of the same material as the shaft, prevents the aluminum sleeve from expanding radially away from the cone. Further, the axial length of the interface between the sleeve and ring can be adjusted to control the amount of thermal compensation into any system, allowing for very accurate control of the thermal compensations scheme.

20 Claims, 4 Drawing Sheets

THERMAL COMPENSATION WITHOUT CREEP IN A HYDRODYNAMIC BEARING

CROSS-REFERENCE TO RELATED APPLICATIONS

This application claims benefit of U.S. provisional patent application Ser. No. 60/270,223 entitled "Low Cost Thermal Compensation Without Creep" filed Feb. 20, 2001 in the name of R. A. Nottingham, is incorporated herein by reference in its entirety.

FIELD OF THE INVENTION

The invention relates to the field of hydrodynamic bearing assemblies, especially of the type that co-operate with a high speed spindle design. More specifically, the invention relates to apparatus for maintaining the bearing stiffness in a hydrodynamic bearing assembly despite substantial variations in temperature.

BACKGROUND OF THE INVENTION

Disc drive memory systems have been used in computers for many years for storage of digital information. Information is recorded on concentric memory tracks of a Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor that drives a hub to support the discs for rotation. Such motors, which are commonly referred to as spindle motors have a spindle or sleeve mounted by means of two ball or one or more hydrodynamic bearing systems to a motor shaft disposed in the center of the hub. Generally, such motors include a stator comprising a plurality of teeth arranged in a circle. Each of the teeth support a plurality of coils or windings that may be sequentially energized to polarize the stator. A plurality of permanent magnets are disposed in alternating polarity adjacent the stators. As the coils disposed on the stators are sequentially energized in alternating polarity, the magnetic attraction and repulsion of each stator to the adjacent magnets causes the spindle or hub to rotate, thereby rotating the disc and passing the information storage tracks underneath the head. This arrangement of stator teeth or laminations, coils and magnets may be mounted either inside the hub or spindle, or lower on the shaft below the hub or spindle in order to make the cross-sectional area occupied by the spindle or rotating sleeve as small as possible.

The use of hydrodynamic bearing assemblies in such disc drive systems has become preferred due to desirable reductions in drive size and noise generation as compared to conventional ball bearing drive systems. In hydrodynamic bearings, a lubricating fluid, such as oil or even air, functions as the bearing surface between a base or housing or shaft and a rotating spindle or hub (or vice versa). The lubricating fluids require small gaps between the stationary and rotating members in order to provide the support, stiffness and lubricity required for proper bearing operation. Thus the drive components and assemblies require tight tolerances and precision assembly methods. Such demanding tolerance and assembly control could result in increased part and assembly costs, along with an increased level of quality control to ensure proper drive operation. Further, with temperature fluctuations during use of the drive, the gaps which are an essential part of each hydrodynamic bearing could easily vary. Any disc drive assembly, and therefore the hydrodynamic bearings which provide the required rotational support, must be capable of operating over wide temperature fluctuations.

Therefore, the problem presented is to provide a disc drive assembly comprising a hydrodynamic bearing, in which the assembly method is simple and straightforward, and results in a hydrodynamic bearing assembly which is easily repeatable and tolerant of wide fluctuations in temperature during operation.

SUMMARY OF THE INVENTION

The present invention has as its objective to provide a bearing design which enables bearing stiffness in a hydrodynamic bearing system to be reliably maintained.

A related objective of the invention is to provide a simplified design for a hydrodynamic bearing comprising a shaft and surrounding sleeve wherever the potential for temperature changes causing viscosity changes causing the hydrodynamic bearing stiffness to change beyond tolerable levels of the disc drive.

In summary, according to the present invention a hydrodynamic bearing is provided comprising a shaft having a pair of spaced apart conical bearings supporting a surrounding sleeve for rotations. The sleeve comprises a single piece rather than the two-piece design separated by a rubber expansion joint of the prior art. Instead upper and lower slots are cut into the sleeve, and the rings are pressed or otherwise lightly fitted into each slot. The single piece sleeve which also incorporates the bearing seats for the conical bearings on the shaft, is made of aluminum, while each ring is made of steel (as is the shaft and bearing cones). As the temperature rises at which the hydrodynamic bearing is operated, the sleeve expands axially putting the bearing seat closer to the cone, effectively compensating for the thinning of the fluid which supports the bearing seat and sleeve for rotation relative to the cone. Meanwhile, the steel ring, being of the same material as the shaft, prevents the aluminum sleeve from expanding radially away from the cone. Further, the axial length of the interface between the sleeve and ring can be adjusted to control the amount of thermal compensation into any system, allowing for very accurate control of the thermal compensations scheme.

Other feature and advantages of the will be apparent to a person skilled in this field who reads the following description of a exemplary preferred embodiment given in conjunction with the following drawings.

BRIEF DESCRIPTION OF THE DRAWINGS

So that the manner in which the above recited and below described features and advantages of the present invention are obtained can be understood in detail, a more particular description of the invention, briefly summarized above, may be had by reference to the embodiments thereof which are illustrated in the following drawings. It is to be noted however that the following drawings illustrate only on or more typical embodiments of the invention and are therefore not to considered limiting of its scope, for the invention may admit to other equally effective embodiments.

DETAILED DESCRIPTION OF THE PREFERRED EMBODIMENTS

The invention herein is especially directed to the design of a hydrodynamic bearing which incorporates, at low cost, thermal compensation in the combination of sleeve and bearing seats and the bearing cone supporter on the shaft. The invention is especially useful in a spindle motor for use in a disc drive data storage device.

Figure 1:
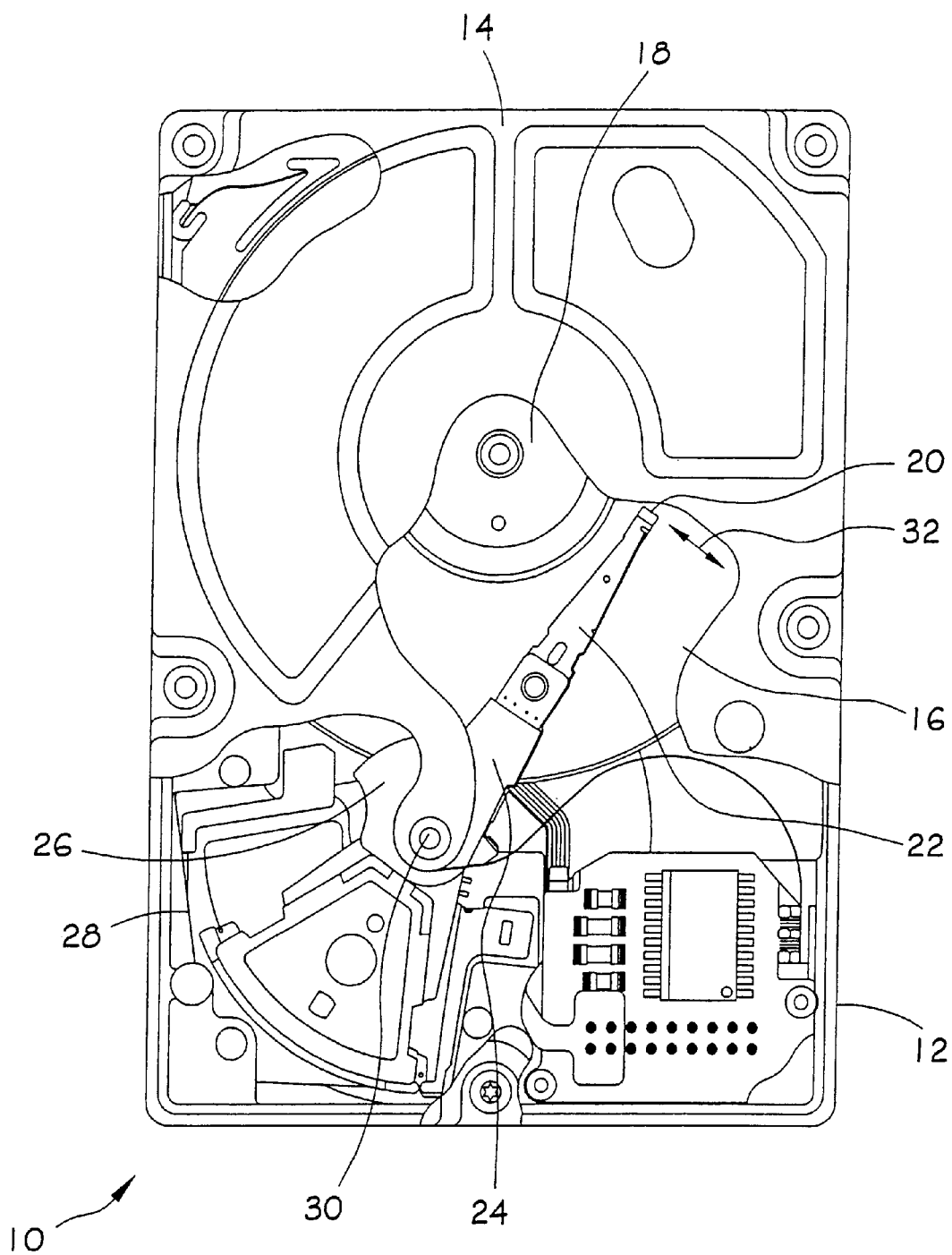
FIG. 1 is a top plan view of disc drive data storage device in which the present invention may be especially useful.

FIG. 1 is a plan view of a typical disc drive 10 wherein a spindle motor utilizing the present invention would be especially useful; this is because of the stability which the present thermal compensation scheme would add to the motor design, minimizing the possibility of non-repeat runout and other variations in performance. In FIG. 1, the disc drive 10 includes a housing base 12 and top cover 14. The housing base 12 is combined with top cover 14 to form a sealed environment to protect the internal components especially the rotating disc by elements outside the sealed environment.

The disc drive 10 further includes a disc pack 16 comprising one or more discs mounted for rotation on a spindle motor by a disc clamp 14. The disc pack includes one or more individual discs, mounted for co-rotation about a central axis. Each disc surface has an associated head that is utilized in disc drive 10 for communicating with the discs surface. In the example shown in FIG. 1, each head 20 is supported by load beam 22 that is in turn attached to head mounted arms 24 of an actuator 26. The actuator shown in FIG. 1 is of the type known as a rotary moving coil actuator. It includes a voice coil motor indicated generally at 28. Voice coil motor 28 rotates actuator body 26 with its attached heads 20 about a pivot shaft 30 to position heads 20 over a desired data track along an arc 32. While a rotary actuator is shown in FIG. 1, the invention is also useful in disc drives having other type of actuators, such as linear actuators.

Figure 2:
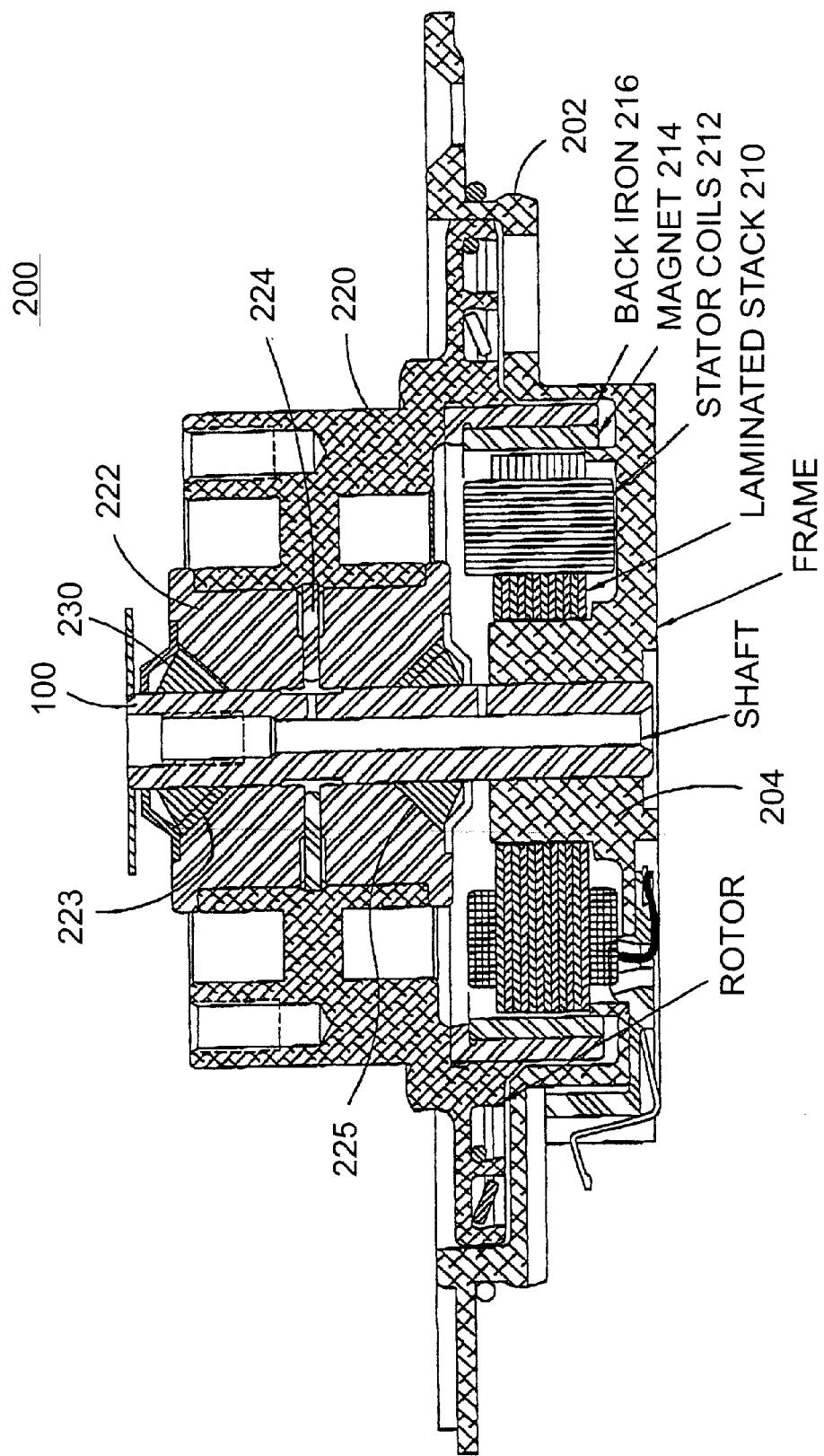
FIG. 2 is a section view of one embodiment of a hydrodynamic bearing spindle motor in which the present invention may be useful.

FIG. 2 is a vertical sectional view of a disc drive spindle motor in which the present invention is useful. FIG. 2 shows a spindle motor 200 supported from a base frame 202 with the shaft 100 being supported from shoulders 204 in the base frame 202. In this particular instance, a fixed shaft motor design is shown; however, obviously the principles and embodiments of the present invention are equally useful with a rotating shaft design having a fixed sleeve for support.

The motor 200 itself includes a laminated stack 210 supporting stator coils 212 adjacent a magnet 214 which is supporting from a back iron 216. The motor and back iron are in turn are supported from a hub 220 which is fixed to a sleeve 222. The sleeve 222 rotates around the shaft 100 and provides the bearing seats generally indicated at 223, 225 for the upper and lower conical bearings. The hub 220 supports as one or more discs (which are not shown in this view) for constant speed rotation has been explained above with reference to FIG. 1. In this art embodiment, the sleeve 222 incorporates a rubber expansion joint 224 in order to accommodate thermal variations which may occur during operation of the system. The sleeve 222 is supported for rotation around the shaft 100 at least in part by upper and lower conical bearings 230 defined by cones near either end of the sleeve which co-operate with the bearing seats 223, 225 to establish the fluid dynamic bearings. The details of the existing cone design, are well known in this field. To the extent necessary, they will be described further with respect to the following description of FIG. 3.

Figure 3:
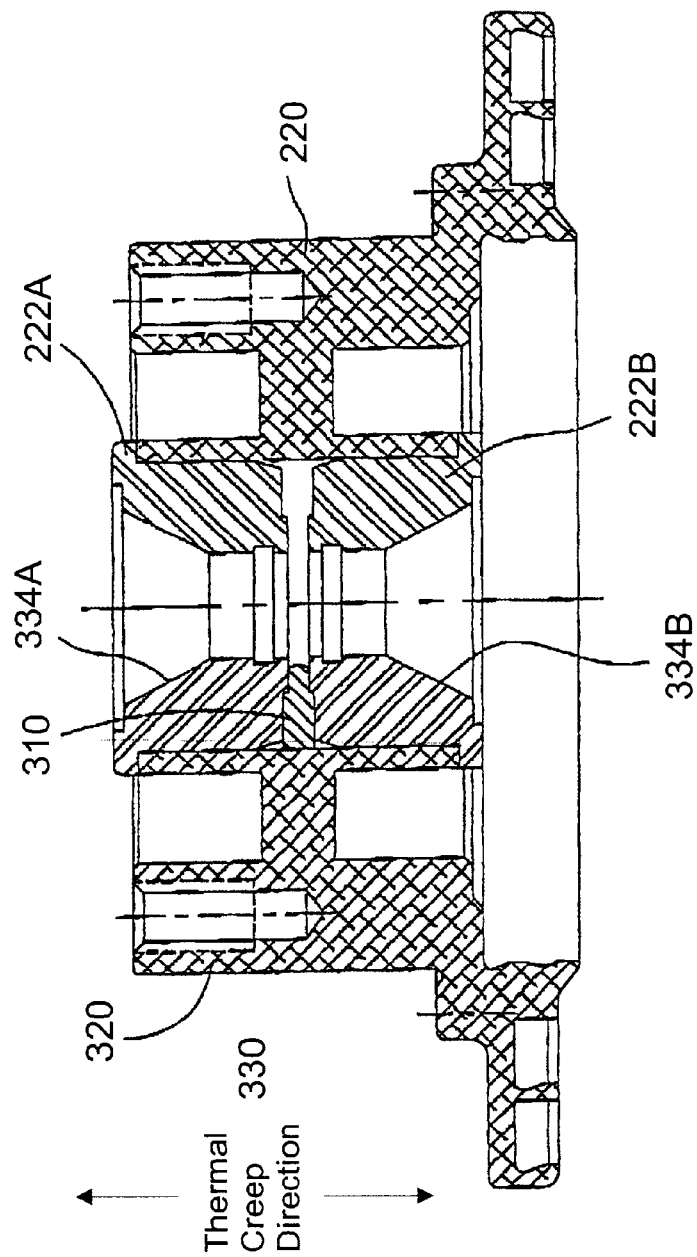
FIG. 3 is a vertical sectional view of one thermal compensation motor design.

FIG. 3 shows a previously designed thermal compensation scheme useful with the embodiment of FIG. 2 and similar designs.

In this design, the sleeve 220 and hub 222 is shown, with the hub being in two sections 222A and 222B. The gap between the two sections 222 is filled with rubber 310 in order to fill the gap, and prevent the leakage of fluid. The pieces of the sleeve 222 are made of steel which has a relatively low thermal expansion rate. The hub, which is supported from the sleeve, is made of aluminum, which has a higher thermal expansion rate. It can be seen from inspection, that as the temperature rises, that the aluminum will expand more than the steel, and tend to push the pieces of the sleeve 222A, B apart axially. When the temperature cools, the parts should be drawn back together by the contraction of the aluminum, but this will not always happen. The result will be that over time, there may well be some thermal creep in the thermal creep direction indicated by the arrow 330. The result is that, comparing this figure to FIG. 2, over time the bearing seats 334A, 334B will be pushed a little further apart axially and closer to the bearing cones 230 which are supported on the sleeve. The result will be that the bearing gaps are somewhat diminished, which imposes power losses on the rotation of the system and may even cause metal-to-metal contact across the hydrodynamic bearing gap between the bearing seat and the bearing cone. Therefore, the advance of FIG. 4 is proposed herein.

Figure 4:
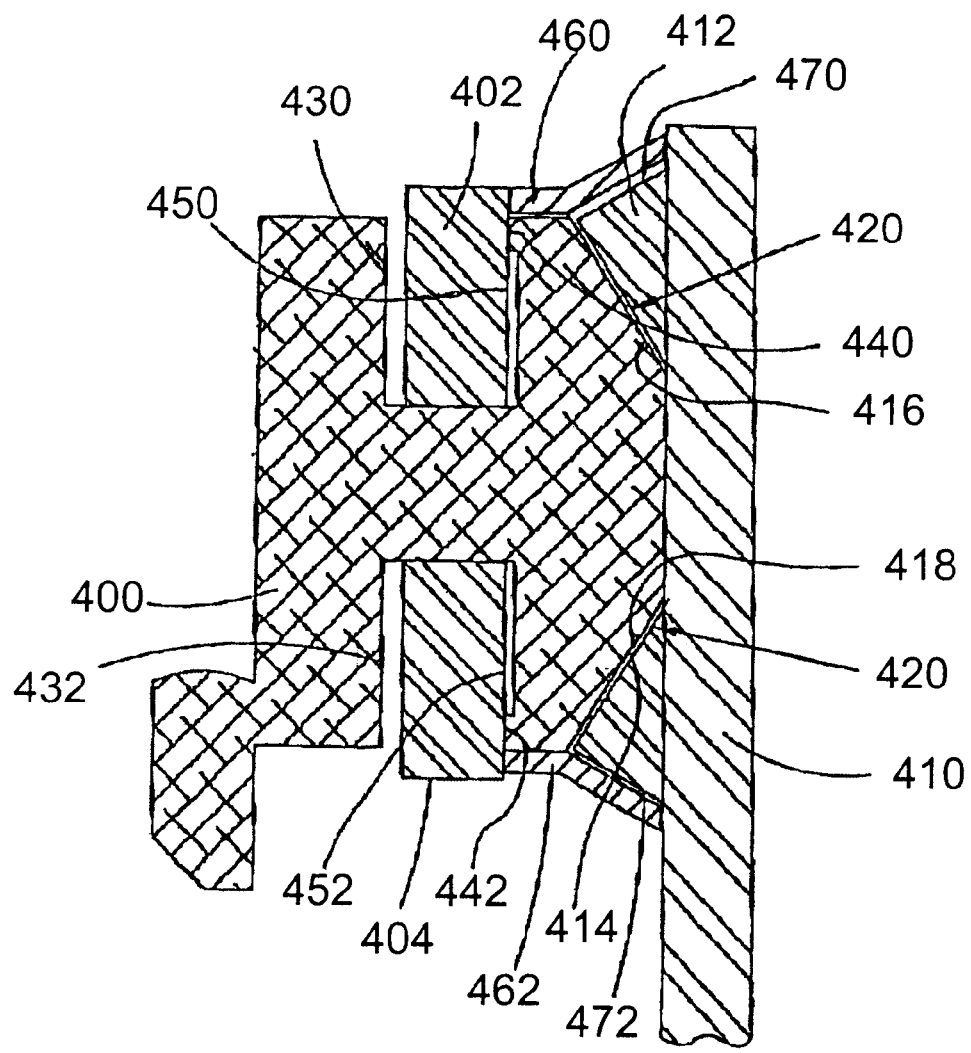
FIG. 4 is a vertical sectional view of the thermal compensation design of the present invention which is intended to eliminate the part creep which may occur in the design of FIG. 3, while providing increased thermal compensation in hydrodynamic bearings of the type shown in the motor of FIG. 2.

FIG. 4 is a partial sectional view showing the relevant elements of an improved assembly for mounting a sleeve in a co-operative relationship with a shaft and a pair of conical bearings, the design utilizes material selection and apparatus which will reduce parts cost, and provide proper levels of thermal compensation under widely variable temperature operating conditions. Therefore, modifications to the design described above and already known in this technology occur primarily with respect to the sleeve 400 and the anti-creep thermal compensation rings 402, 404. The bearing system includes a shaft 410 supporting a pair of cones 412, 414. Each of these cones co-operates with a bearing seat 416, 418 defined by the sleeve 400 to define a fluid dynamic bearing. The bearing surface itself is provided by fluid 420 which resides in and is maintained in the gap defined between each bearing cone and the co-operating bearing seat. The fluid is maintained in the gap as is known by groove patterns on one of the two surfaces facing the gap. It is also well-known from hydrodynamic bearing technology that the gap is extremely small, measured in microns, and must remains substantially constant even under the influence of drastic changes in operating or ambient temperatures to which the disc drive may be exposed. A number of approaches have been made to avoid changes in this gap setting.

In this case, however, a new thermal compensation design is adopted which as a starting point combines the aluminum sleeve 400 which defines the two female bearing seats 416, 418, into a single part. Having both bearing seats combined into a single part eliminates the possibility of having thermal creep as can occur with the design of FIG. 3. Having the design made mostly out of aluminum will make the sleeve 400 easier to machine and will reduce the cost. However, it is apparent that the issue of differing rates of thermal expansion is introduced. Specifically, the aluminum which is used to form the bearing sleeve has a higher thermal expansion rate (about two times) than the steel which is used to form the cones 412, 414 which are supported on the shaft.

In order to allow for the fact that the aluminum has a different rate of thermal expansion than steel, a pair of steel rings 402, 404 are fit tightly into axially upper and lower slots or openings 430, 432 in the sleeve. These slots are preferably at least equal in axial depth to the axial extent of bearing seats 416, 418. The rings 402, 404 each bear against a shoulder 440, 442, protruding into the slot which is substantially aligned with the location of the bearing cone and bearing seat, and especially the axially distal end thereof. As the temperature of the system rises, the aluminum which has a greater coefficient of thermal expansion, will axially expand toward the cone, and effectively close the gap which is defined between the bearing seat 418 and the bearing cone 412, 414. This is desirable because if the temperature increase is significant, the bearing fluid will thin therefore in order to maintain the desired level of support across the gap, the gap must be narrowed.

It can also be seen that the shoulder 440, 442 of the sleeve which is pressed against the inner diameter of the ring 402, 404 has a defined length relative to contact with the ring. It has been observed that each of the shoulders 442, 444 could have its axial length modified in order to control the amount of thermal compensation put into the system by the steel ring. The effect of the steel ring is that as the steel ring expands less axially then the aluminum expands, but at the same rate as the shaft and bearing cones. Thus the aluminum sleeve cannot move away from the bearing cone 412, 414. Therefore, the effect of the aluminum expansion is to move each bearing seat 416, 418 closer to the facing surface of the bearing cone, shrinking the gap. The greater the exposed length of the sleeve shoulder 442, 444 to the co-operating interior diameter ring surface 450, 452, the more the gap can be shrunk with dramatic change in temperature. With such dramatic change in temperature, such shrinkage of the gap becomes more significant because the oil will thin even more. But because the gap shrinks, the effectiveness of the fluid in supporting the shaft and sleeve for relative rotation is maintained. Therefore, the present single piece sleeve design with accompanying steel compensation rings provides a much more consistent system spacing for wide temperature variation.

It should also be noted that as is well known in this technology, shields 460, 462 are provided supported on the axial surfaces of the sleeve. The radially outer ends of these shields may be pressed against the same steel rings, so that they cannot move away from their cooperative relationship to the secondary conical surfaces 470, 472 of the conical bearing design.

In summary, what is effectively happening is that since the shaft and bearing cones are made of steel as are the steel rings, but the sleeve is made of aluminum which has a thermal coefficient of expansion twice as great as steel, then in the axial direction, expansion of the aluminum with change in temperature will be about twice as great as the expansion of the steel sleeve. Therefore, the bearing gap will be closed down somewhat, thereby compensating for the thinning out of the bearing supporting fluid. In contrast, considering the radial direction, the presence of the steel rings pressing against the shoulders 440, 442 means that the sleeve cannot move away from the gap formed by the sleeves bearing seat with the bearing cone, and therefore, with the change in temperature, and the steel ring 402, 404 expanding only as much as the steel shaft and the bearing seat is maintained close to the cone.

In this way, the effectiveness of the expansion of the sleeve with temperature in modifying the bearing gap is enhanced.

Other features and advantages of this invention will be apparent to a person of skill in the art who studies this disclosure. Therefore, the scope of this invention is to be limited only by the following claims.

What is claimed:

1. A fluid dynamic bearing comprising a steel shaft and a surrounding sleeve, the shaft and the sleeve being supported for rotation by a pair of bearing cones spaced apart along the shaft, each of cones having an angular surface facing a bearing seat defined on the sleeve, the angular surface of each cone and the bearing seat defining a gap filled with fluid for supporting relative rotation between the shaft and the sleeve, the shaft and bearing cones being made of materials having a first coefficient of expansion, and the sleeve being made of material having a second coefficient of expansion, and the sleeve further comprising axially extending recesses into the sleeve radially aligned with at least part of each of the bearing cones, and an annular ring in each of said recesses made of a material having substantially the same coefficient of expansion as the shaft and bearing cones, for minimizing radial thermal expansion of the sleeve in the region of the bearing gap.

2. A fluid dynamic bearing as claimed in claim 1 wherein the sleeve radially adjacent each of the axial recesses in which the ring is inserted includes a shoulder extending radially away from the cone, the axial length of the shoulder being adjusted to determine the axial shoulder length which bears against an inner diameter surface of the annular ring.

3. A motor as claimed in claim 1 wherein the coefficient of thermal expansion of the sleeve is about twice the coefficient of thermal expansion of the shaft and bearing cones.

4. A fluid dynamic bearing as claimed in claim 1 wherein the sleeve is formed of a single piece of aluminum.

5. A fluid dynamic bearing as claimed in claim 4 wherein the shaft and bearing cones are steel.

6. A fluid dynamic bearing as claimed in claim 1 wherein the annular rings are both the same material and are steel.

7. A fluid dynamic bearing as claimed in claim 6 wherein the sleeve radially adjacent each of the axial openings in which the ring is inserted includes a shoulder extending radially away from the cone, the axial length of the shoulder being adjusted to determine the axial shoulder length which bears against an inner diameter surface of the annular ring.

8. A fluid dynamic bearing as claimed in claim 1 wherein each of the axial recesses in the sleeve is of a depth at least equal to the axial extent of the bearing seat.

9. A fluid dynamic bearing as claimed in claim 8 wherein the shoulders which contact the inner diameter of the ring are substantially aligned with the axially distal end of each of the fluid dynamic bearings formed by the bearing seat and cooperative surface of the bearing cone.

10. A spindle motor for use in a disc drive comprising a shaft, shaft supporting a sleeve and a hub for relative rotation, the hub supporting one or more discs for storage of data thereon, the motor including a fluid dynamic bearing comprising the shaft and the surrounding sleeve, the shaft and the sleeve being supported for rotation by a pair of bearing cones spaced apart along the shaft, each of the cones having an angular surface facing a bearing seat defined on the sleeve, the angular surface of each cone and the bearing seat defining a gap filled with fluid for supporting relative rotation between the shaft and the sleeve, the shaft and bearing cones being made of materials having a first coefficient of expansion, and the sleeve being made of material having a second coefficient of expansion, and the sleeve further comprising axially extending slots into the sleeve radially aligned with at least part of each of the bearing cones, and an annular ring in each of said recesses made of a material having substantially the same coefficient of expansion as the shaft and bearing cones, for minimizing radial thermal expansion of the sleeve in the region of the bearing gap.

11. A motor bearing as claimed in claim 10 wherein the sleeve radially adjacent each of the axially extending slots in which the ring is inserted includes a shoulder extending radially away from the cone.

12. A motor as claimed in claim 11 wherein the sleeve is formed of a single piece of aluminum.

13. A motor as claimed in claim 12 wherein the shaft and bearing cones are steel.

14. A motor as claimed in claim 13 wherein the annular rings are both of the same material and are steel.

15. A motor as claimed in claim 14 wherein the sleeve radially adjacent each of the axial by extending slots in which the ring is inserted includes a shoulder extending radially away from the cone, the axial length of the shoulder determines the axial shoulder length which bears against an inner diameter surface of the annular ring.

16. A motor as claimed in claim 15 wherein each of the axially extending slots in the sleeve is of a depth at least equal to the axial extent of the bearing seat.

17. A motor as claimed in claim 16 wherein the shoulders which contact the inner diameter of the ring are substantially aligned with the axially distal end of each of the fluid dynamic bearings formed by the bearing seat and cooperative surface of the bearing cone.

18. A fluid dynamic bearing comprising a shaft and a surrounding sleeve, the shaft and the sleeve being supported for rotation by a pair of bearing cones spaced apart along the shaft, each of cones having an angular surface facing a bearing seat defined on the sleeve, the angular surface of each cone and the bearing seat defining a gap filled with fluid for supporting relative rotation between the shaft and the sleeve, the shaft and bearing cones being made of materials having a first coefficient of expansion, and the sleeve being made of material having a second coefficient of expansion, and the sleeve further comprising axially extending slots into the sleeve radially aligned with at least part of each of the bearing cones, and means for restraining radial thermal expansion of the sleeve in the region of the bearing gap.

19. A bearing as claimed in claim 18 wherein the means for restraining radial thermal expansion comprises an annular ring in each of the slots.

20. A bearing as claimed in claim 19 wherein the annular ring comprises material of the first coefficient of expansion.

* * * * *